United States Patent [19]

Nolen

[11] Patent Number: 4,776,720

[45] Date of Patent: Oct. 11, 1988

[54] ROD END MOUNT

[75] Inventor: Robert K. Nolen, Chicago, Ill.

[73] Assignee: Maremont Corporation, Carol Stream, Ill.

[21] Appl. No.: 32,311

[22] Filed: Mar. 30, 1987

[51] Int. Cl.⁴ .................................................. F16B 9/00
[52] U.S. Cl. ..................................... 403/71; 403/122; 403/143
[58] Field of Search ..................... 403/70, 71, 76, 77, 403/143, 122

[56] References Cited

U.S. PATENT DOCUMENTS

| | | | |
|---|---|---|---|
| 31,635 | 7/1884 | Smith et al. | 403/144 |
| 410,570 | 9/1889 | Arnold | |
| 844,421 | 2/1907 | Strafford | |
| 1,265,445 | 5/1918 | Hagen | |
| 1,293,374 | 2/1919 | Dodds | |
| 1,868,891 | 7/1932 | Faudi | |
| 2,513,637 | 7/1950 | Herreshoff et al. | 287/21 |
| 2,530,554 | 11/1950 | Tinnerman | 287/90 |
| 2,601,875 | 7/1952 | Dardani | 139/151 |
| 2,854,266 | 9/1958 | Dies | 287/90 |
| 2,859,060 | 11/1958 | Davies et al. | 403/122 |
| 2,987,333 | 6/1961 | Lobdell | 287/90 |
| 3,097,005 | 7/1963 | Fickler | 287/90 |
| 3,269,760 | 8/1966 | Seckerson | |
| 3,503,640 | 3/1970 | Eberle | 287/21 |
| 3,856,422 | 12/1974 | Trefry | 403/122 |
| 4,221,367 | 9/1980 | Smith | 267/64 R |
| 4,268,018 | 5/1981 | Langanke | 267/120 |
| 4,360,284 | 11/1982 | Brandenburg | 403/133 |
| 4,367,968 | 1/1983 | Ishida | 403/122 |
| 4,505,058 | 3/1985 | Peterson | 37/142 A |
| 4,520,546 | 6/1985 | Darnell | 29/441 R |
| 4,581,953 | 4/1986 | Walsten et al. | 74/501 R |
| 4,615,638 | 10/1986 | Ito | 403/135 |
| 4,634,309 | 1/1987 | Dewey | 403/324 |

Primary Examiner—Andrew V. Kundrat
Attorney, Agent, or Firm—Allegretti & Witcoff, Ltd.

[57] ABSTRACT

An improved rod end mount is disclosed for releasably attaching the rod members of a gas spring and the spherical portion of a ball stud. The base of the end mount has a longitudinal bore to receive the rod member and an intersecting transverse slot. A rod clip of approximately the same outer dimensions as the slot slides into the slot to engage and secure the rod member within the end mount. The integral body of the end mount comprises, in addition to the base, an arch with a passage for receiving the ball stud. To rotatably attach the ball stud within the end mount, a retainer clip of approximately the same outer dimensions as the arch is placed over the arch. This retainer clip surrounds the arch and engages the ball stud. The rod clip and retainer clip act independently to releasably connect the rod member and ball stud, respectively, to the integral body of the end mount.

4 Claims, 2 Drawing Sheets

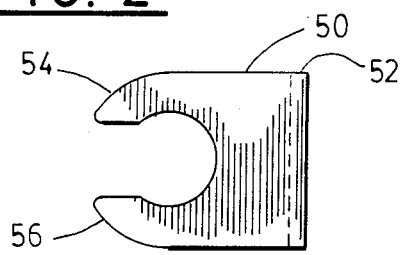
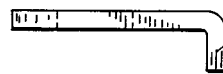
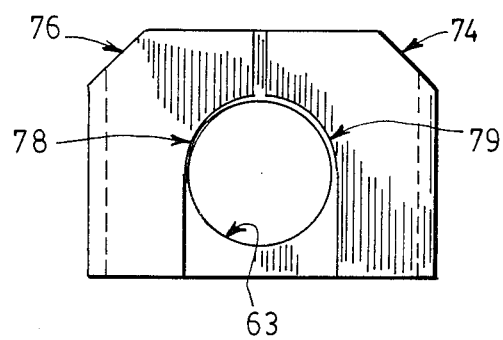
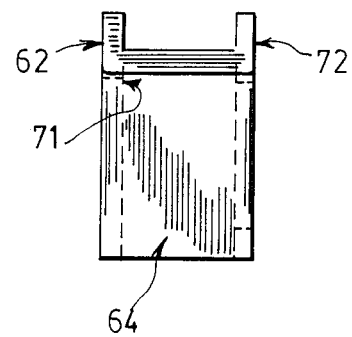
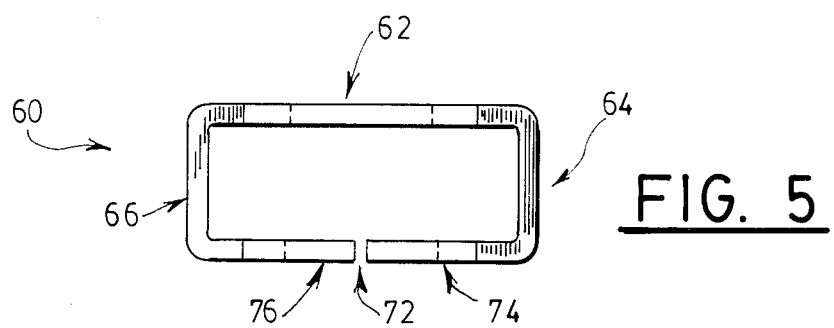

ROD END MOUNT

BACKGROUND OF THE INVENTION

The present invention relates generally to a rod end mount of the type which interconnects a ball stud member to a rod member of a gas spring.

More specifically, the rod end mount according to this invention includes a rod clip that snaps over the rod member to substantially fix the rod member in place. The rod clip is designed to allow convenient and easy attachment and detachment of the rod member; simply pushing or pulling the rod clip with sufficient force to separate the substantially flexible securing prongs of the rod clip will engage or disengage the rod member. This design ensures, however, that neither the rod clip nor the rod member will become disengaged during use.

Similarly, the rod end mount according to this invention includes a retainer clip that snaps over the top and neck of the ball stud member to substantially secure, rotatably, the position of the ball stud in place. The retainer clip is designed to allow convenient and easy assembly and disassembly of the ball stud to the body of the end mount by simply pushing or pulling the retainer clip with sufficient force to separate the substantially flexible securing arms of the retainer clip and engage or disengage the ball stud. This design ensures, however, that neither the retainer clip nor the ball stud will become disengaged during use.

The rod clip and retainer clip attach to the rod end mount separately and independently. Therefore, the rod member and ball stud member may be attached to the rod end mount separately and independently. Moreover, detachment of either the rod member or ball stud member is possible without affecting the attachment of the member remaining attached to the rod end mount.

The invention has a wide range and variety of applications and uses. It is particularly useful in automobile installations: the rod end mount is applied to the outer end of the piston rod of a gas spring that counterbalances the closure for a hatchback vehicle or a trunk lid or other similar component.

Presently known devices that fasten piston rod members or retain ball studs abound. A few known devices even perform both functions. All of these devices, however, may be grouped into two categories. The first category includes more complicated devices, which often require time, a number of steps, skill, and perhaps tools to connect and disconnect the rod members or ball studs. Even if assembly is unaffected, the difficulty and expense of manufacturing these devices is often a drawback.

The second category of known devices for securing piston rod members and ball studs includes the more simple structures. These devices may permit inadvertent disengagement, often because the connecting structure is externally exposed and has unprotected lips, tabs, pins, wires, extensions, tongues, skirts, flanges, or the like. Simpler devices usually provide two or four-point contact between the fastening or retaining means and the ball stud or rod member. Such contact often allows relative movement between the contacting structures.

Simple or complex, the presently known devices were designed with different goals in mind. Flexibility is provided in many designs to foster ease of assembly and disassembly; this same flexibility allows inadvertent disengagement. Thus, although quite satisfactory in operation, none of the presently known devices avoids all of the disadvantages common to fastening piston rod members and retaining ball studs.

SUMMARY OF THE INVENTION

It is an object of the invention to provide a device that can secure the rod members of a gas spring and the spherical portion of a ball stud while avoiding the disadvantages of the known devices. More specifically, one object of the invention is to fix the rod member and ball stud in place, preventing undesirable movement.

Another object is to provide an optimal contact area between the rod clip and rod member and between the retainer clip and ball stud. Such an optimal area achieves the further objects of fixedly locking the mating structures together upon engagement while decreasing wear between the mating surfaces. An area greater than mere two or four-point contact, but less than full circumferential contact, is found to achieve these objects.

Quick and easy assembly and disassembly is desireable; therefore, it is an object of this invention. Both the rod clip and retainer clip engage and disengage the rod member and ball stud, respectively, through simple push and pull movements. The ability to use such movements achieves another object by avoiding the necessity of using external tools to assemble and disassemble the structures. A handle on the rod clip facilitates attaining these two objects.

A related object is to prevent inadvertent disengagement by either the rod or retainer clip without adding structure to the device, such as a locking cap. A large contact area, the absence of unprotected external structure that might activate disengagement, and the locking nature of the design all serve to attain this object.

A device that is easier to assemble and manufacture represents a further object of this invention. Both the rod clip and retainer clip have simple, flat, rectangular features to achieve this object. With respect to the retainer clip, its features also achieve the advantage of avoiding more complicated ball fastener designs that contact the entire spherical surface of the ball and increase wear and difficulty in manufacture.

Finally, it is an object of this invention to protect the rod clip from damage caused by external objects that might interfere with this clip. By designing the rod clip to be inserted into a slot surrounded by the protective structure of the rod end mount's base, this object is achieved.

Further objects and advantages of the present invention will be apparent from the following detailed description and the claims, when considered with the accompanying drawings.

BRIEF DESCRIPTION OF THE DRAWING

A preferred embodiment of the present invention will be described, in detail, with reference to the drawing wherein:

FIG. 2 is a top view of the rod clip;

FIG. 3 is a side view of the rod clip;

FIG. 4 is a front view of the rod clip;

FIG. 5 is a top view of the retainer clip;

FIG. 6 is a side view of the retainer clip;

FIG. 7 is a front view of the retainer clip;

DESCRIPTION OF A PREFERRED EMBODIMENT

Figure 1:
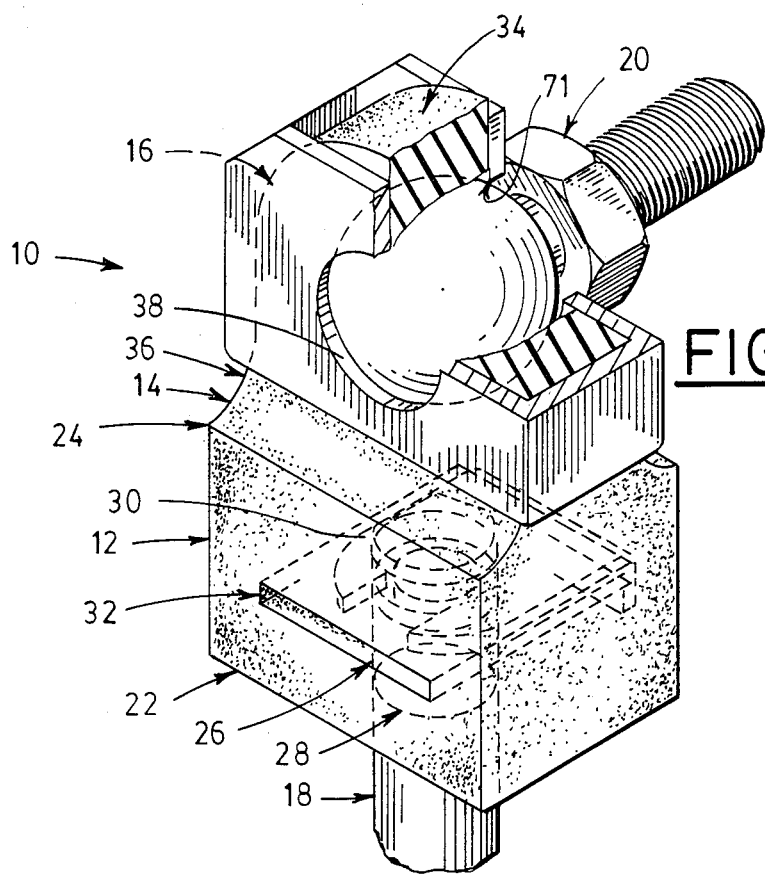
FIG. 1 is a partial perspective view of a rod end mount including and incorporating a preferred embodiment of the present invention.

The rod end mount illustrated in FIGS. 1-9 comprises an integral body 10 (FIG. 1) formed of a material such as plastic, which can be combined with reinforcing materials, and including a rectangular base 12, an arcuate shoulder 14, and a generally U-shaped arch 16. The integral body 10 incorporates the rod member 18 of a gas spring and a ball stud 20.

The base 12 has a lower end 22 and an upper end 24 that forms an integral connection with the shoulder 14. A longitudinal bore 26 is formed in the base 12 to receive the rod member 18. This bore 26 extends from an entrance end 28 in the lower end 22 of the base 12 to a terminating end 30 (FIG. 9, especially) within the base 12. To provide tight contact between the bore 26 and rod member 18, the diameter of the bore 26 is only slightly larger than the diameter of the rod member 18. Also formed in the base 12 is a transverse slot 32 which extends completely through the base 12. The slot 32 intersects the bore 26 just below the terminating end 30 of the bore 26.

The arch 16 has a rounded upper portion 34 and a lower portion 36 that forms an integral connection with the shoulder 14. A passage 38 extends completely through the arch 16 to receive the ball stud 20.

Figure 9:
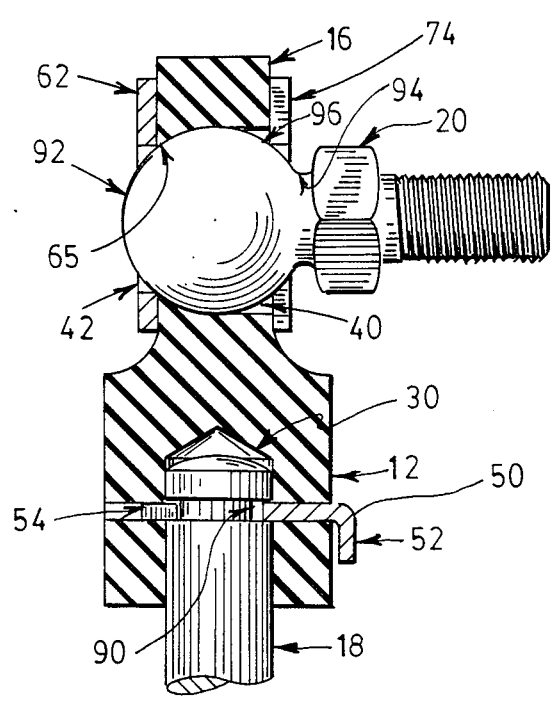
FIG. 9 is a side cross-sectional view of the preferred embodiment taken along line 9—9 in FIG. 8.

Referring now to FIGS. 1 and 9, the passage 38 has a larger opening 40, which initially receives the ball stud 20 upon insertion, and a smaller opening 42, which engages the ball stud 20 only after the ball stud 20 has passed through the larger opening 40 and the center of the passage 38.

An L-shaped rod clip 50 shown in FIGS. 2-4 and 9 engages the rod member 18 and locks it in place within the base 12. The rod clip 50 is of approximately the same outer dimensions as the slot 32 in the base 12. To facilitate sliding the rod clip 50 in and out of the slot 32, a handle 52 is provided on one end of the rod clip. The handle extends perpendicularly away from this end. The rod clip 50 has at its opposite end a pair of substantially flexible securing prongs 54, 56 which engage the rod member 18.

Referring now to FIGS. 5-7, a rectangular retaining clip 60 is designed to engage the ball stud 20 and lock it in place within the arch 16. The retaining clip 60 is of approximately the same outer dimensions as the arch 16 so as to surround the arch 16. A rear face 62 is an integral part of the retaining clip 60. This rear face 62 has a substantially circular aperture 63 to receive the top 92 of the ball stud 20 (FIG. 9). Two rectangular parallel side faces 64, 66 are also integrally part of the retaining clip 60, and extend from opposite edges of the rear face 62. The final integral part of retaining clip 60 is a front face 72 which consists of a pair of substantially flexible securing arms 74, 76 attached at opposite edges, respectively, to the two side faces 64, 66.

Figure 8:
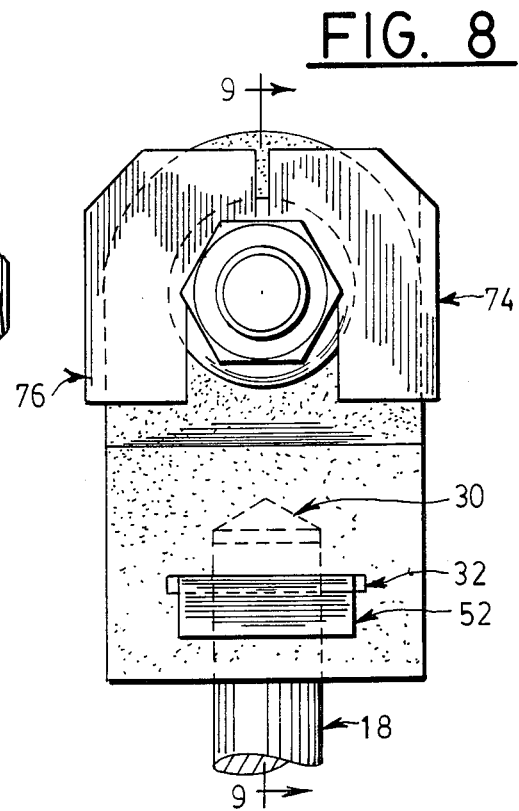
FIG. 8 is a front view of the rod end mount and preferred embodiment shown in FIG. 1.

In assembling the rod end mount of this invention, two separate steps are necessary. These steps proceed independently; therefore, they may occur in any order. Referring to FIGS. 8 and 9, one step involves insertion of the rod member 18 into the bore 26. Because the diameter of the bore 26 corresponds to the diameter of the rod member 18, a secure fit is achieved. After the rod member 18 is fully inserted, such that the groove 90 of the piston rod 18 is aligned with slot 32 of the base 12, the rod clip 50 is inserted into the slot 32 using the handle 52. The securing prongs 54, 56 of the rod clip 50 engage the circumferential groove 90 of rod member 18 and lock the rod member 18 in place within the base 12.

The second step involves insertion of the ball stud 20 into the larger opening 40 of the passage 38 in the arch 16. Insertion continues until the top 92 of the ball stud 20 contacts the smaller opening 42 of the passage 38. The retaining clip 60 is then placed over the arch 16. The clip is placed so that the aperture 63 in the rear face 62 of the retaining clip 60 fits over the smaller opening 42 of the passage 38. The inner periphery 65 of aperture 63 also contacts the spherical surface 96 of the ball stud 20 providing a detent-type relation between the ball and clip. The inner edge 71 of arcuate surfaces 78, 79 of the retaining clip 60 engages the spherical surface 96 of the ball stud 20 and locks the ball stud 20 in place within the arch 16. The side faces 64, 66 of the retaining clip 60 contact the arch 16 when the retaining clip 60 is in place to achieve a secure fit.

The rod clip 50 and retaining clip 60 require pushing forces to assemble the rod end mount of this invention. A pushing force on the handle 52 of rod clip 50 allows the securing prongs 54, 56 of the rod clip 50 to engage the rod member 18 after rod member 18 is inserted into the bore 26. Similarly, a pushing force on the retaining clip 60 allows the securing arms 74, 76 and the periphery of aperature 63 of the retaining clip 60 to engage the ball stud 20 after the ball stud 20 is inserted into the passage 38.

To disassemble the rod end mount, a reversal of the foregoing assembly procedure is required. Thus, the rod member 18 is detached by pulling the handle 52 of rod clip 50 such that securing prongs 54, 56 disengage the rod member 18. Then rod member 18 is removed from the end mount by sliding it from the bore 26. Similarly, the ball stud 20 is detached by pulling the retaining clip 60 such that the periphery of aperture 63 and securing arms 74, 76 disengage the ball stud 20. Then ball stud 20 is removed from the end mount by sliding it from the passage 38.

According to the present invention, the rod end mount is quick and easy to assemble or disassemble, is easy and inexpensive to manufacture, and offers reliable and extended operation.

A single preferred embodiment of the present invention has been disclosed herein. It is to be understood, however, that various changes and modifications can be made without departing from the true scope and spirit of the present invention as set forth and defined in the following claims. For example, words used in the claims to indicate the orientation of elements may serve explanatory purposes and are not meant to limit the scope of the present invention.

What is claimed is:

1. A rod end mount for releasably attaching a rod member and the spherical portion of a ball stud which comprises:

an integral body having a base, a shoulder, and an arch;

said base having a lower end, an upper end for integrally connecting said shoulder, a longitudinal bore for receiving said rod member, and a transverse slot through said base and intersecting said bore;

said arch having a lower portion for integrally connecting said shoulder, a rounded upper portion, and a passage, having a larger opening and a smaller opening, extending through said arch for receiving said ball stud;

said shoulder integrally connected to said upper end of said base and integrally connected to said lower portion of said arch for providing a continuous body;

a rod clip of approximately the same outer dimensions as said slot in said base for removably sliding into said slot and securing said rod member to said body; and a retainer clip of approximately the same outer dimensions as said arch for removably surrounding said arch and rotatably attaching said ball stud to said body, said retainer clip having a rear face having a substantially circular aperture for engaging said spherical portion of said ball stud and at assembly being coincident with said smaller opening of said arch, two parallel side faces attached to opposite edges of said rear face, and a front face attached to each side face at opposite edges and having a pair of substantially flexible securing arms for engaging said ball stud.

2. A rod end mount as claimed in claim 1 wherein said rod clip has a handle on one end for inserting and removing said piston rod clip into and from said slot in said base, and a pair of substantially flexible securing prongs on its opposite end for engaging said rod member.

3. A rod end mount as claimed in claim 1 wherein said bore in said base extends from an entrance end in said lower end of said base to a terminating end within said base and has a diameter corresponding to the diameter of said rod member to allow tight contact between said bore and said rod member.

4. A rod end mount as claimed in claim 1 wherein said body is plastic.

* * * * *